United States Patent
Rousseau

(10) Patent No.: US 10,919,502 B2
(45) Date of Patent: Feb. 16, 2021

(54) REAR VIEW SYSTEM AND METHOD FOR OPERATING THE SYSTEM

(71) Applicant: Valeo Systèmes d'Essuyage, Le Mesnil Saint Denis (FR)

(72) Inventor: Jean-François Rousseau, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 415 days.

(21) Appl. No.: 15/543,722

(22) PCT Filed: Jan. 21, 2016

(86) PCT No.: PCT/EP2016/051248
§ 371 (c)(1),
(2) Date: Jul. 14, 2017

(87) PCT Pub. No.: WO2016/116568
PCT Pub. Date: Jul. 28, 2016

(65) Prior Publication Data
US 2017/0369039 A1 Dec. 28, 2017

(30) Foreign Application Priority Data
Jan. 22, 2015 (FR) ...................................... 1550514

(51) Int. Cl.
*B60S 1/56* (2006.01)
*B60S 1/62* (2006.01)
(Continued)

(52) U.S. Cl.
CPC ............ *B60S 1/566* (2013.01); *B60S 1/3404* (2013.01); *B60S 1/56* (2013.01); *B60S 1/62* (2013.01);
(Continued)

(58) Field of Classification Search
CPC .......... G02B 27/0006; G01N 2021/152; B60R 1/00; B60R 1/001; B60R 11/04;
(Continued)

(56) References Cited

U.S. PATENT DOCUMENTS 1,568,298 A * 1/1926 Somerville ............ B61D 25/00
15/250.31
3,718,940 A * 3/1973 Bode ...................... B60S 1/3805
15/250.06
(Continued)

FOREIGN PATENT DOCUMENTS

DE 296 16 586 U1 3/1997
DE 10 2005 021672 A1 11/2006
(Continued)

OTHER PUBLICATIONS

Machine translation of description portion of German publication 102005021672, published Nov. 2006. (Year: 2006).*
(Continued)

*Primary Examiner* — Gary K. Graham
(74) *Attorney, Agent, or Firm* — Osha Bergman Watanabe & Burton LLP

(57) ABSTRACT

The invention concerns a rear view system (1) of a motor vehicle comprising:—an optical image capturing sensor (3),—a protective support (5) comprising a transparent and flat protective screen (7), the optical sensor (3) being installed on the protective support (5) in such a way as to point through said protective screen (7), and—a scraper blade (9) for cleaning the protective screen (7) disposed on the face of the protective screen (7) opposite that of the optical sensor (3) side, characterised in that it further comprises an electromagnetic actuation device (11) for actuating said scraper blade (9) in translation on the protective screen (7).

11 Claims, 1 Drawing Sheet

Figure 1:
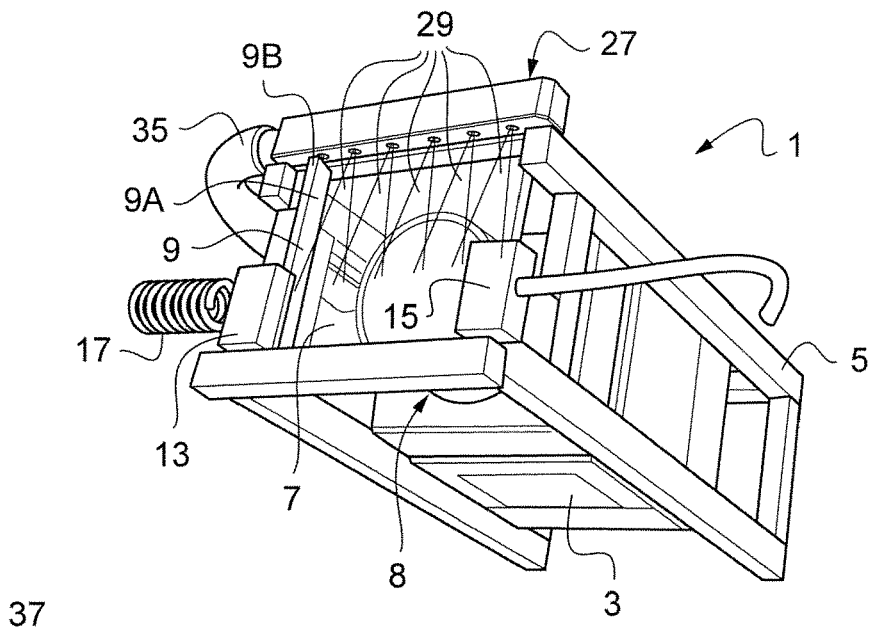

(51) Int. Cl.
*G02B 27/00* (2006.01)
*B60S 1/34* (2006.01)
*H04N 5/225* (2006.01)
*B60S 1/52* (2006.01)
*B60S 1/38* (2006.01)

(52) U.S. Cl.
CPC ....... *G02B 27/0006* (2013.01); *H04N 5/2251* (2013.01); *B60S 1/3805* (2013.01); *B60S 1/52* (2013.01)

(58) Field of Classification Search
CPC .... B60S 1/08; B60S 1/56; B60S 1/566; B60S 1/62; B60S 1/0848; B60S 1/66; B60S 1/3404; B60S 1/52; B60S 1/3805; H04N 5/2251; H04N 5/2252
USPC ............ 15/250.29, 250.002, 250.003, 250.3, 15/250.15, 250.06, 250.07, 250.41
See application file for complete search history.

(56) References Cited

U.S. PATENT DOCUMENTS

| | | | | |
|---|---|---|---|---|
| 3,837,032 | A | * | 9/1974 | Ulbrich ..................... B60S 1/08 15/250.17 |
| 3,866,258 | A | * | 2/1975 | DeGraw ............... B60R 1/0602 15/250.29 |
| 2006/0171704 | A1 | | 8/2006 | Bingle et al. |
| 2006/0256459 | A1 | | 11/2006 | Izabel et al. |
| 2010/0219173 | A1 | * | 9/2010 | Gruber .................. B60S 1/0848 219/203 |
| 2013/0146577 | A1 | * | 6/2013 | Haig .................... B60H 1/0025 219/202 |

FOREIGN PATENT DOCUMENTS

| | | |
|---|---|---|
| EP | 0 276 341 A1 | 8/1988 |
| JP | S49-013843 A | 2/1974 |
| JP | H05-48940 A | 2/1993 |
| JP | 8-111801 * | 4/1996 |
| JP | H10-294886 A | 11/1998 |
| JP | 2007-500096 A | 1/2007 |
| JP | 2008-155801 A | 7/2008 |
| JP | 2011-240920 A | 12/2011 |
| JP | 2013-119299 A | 6/2013 |
| JP | 2014-125104 * | 7/2014 |
| WO | 2005-021329 A1 | 3/2005 |
| WO | 2005-039934 A2 | 5/2005 |
| WO | 2014/103726 A1 | 7/2014 |

OTHER PUBLICATIONS

Machine translation of description portion of Japanese publication 2014-125104, published Jul. 2014 (Year: 2014).*
International Search Report issued in PCT/EP2016/051248 dated Apr. 29, 2016 (3 pages).
Written Opinion of the International Searching Authority issued in PCT/EP2016/051248 dated Apr. 29, 2016 (6 pages).
Notification of Reason for Rejection in corresponding Japanese Application No. 2017-538704, dated Oct. 1, 2019 (13 pages).

* cited by examiner

REAR VIEW SYSTEM AND METHOD FOR OPERATING THE SYSTEM

The present invention relates to a rear view system for a motor vehicle and to a method of operating the rear view system.

Nowadays rear view cameras are fitted to many modern motor vehicles and in particular form part of a parking assistance system that facilitates parking in a parking space without having to turn round and detecting obstacles situated behind the vehicle.

There are known video cameras that are installed inside the passenger compartment against the rear window and pointing rearward from the rear window of the vehicle. These video cameras are well protected from external climatic influences and can for example have the benefit of systems for de-icing and cleaning the rear window, for example a heating wire integrated into the glass of the rear window.

However, the viewing angle is not the optimum, notably for assisting parking, and for this reason it is preferable for the video camera to be arranged at the level of the rear bumper or at the level of the rear license plate of the vehicle.

In this case, the video camera is therefore greatly exposed to splashes of dirt that can be deposited on its lens and therefore reduce its effectiveness or even render it inoperative.

In rainy weather in particular splashing with rain and dirt can greatly affect the functionality of the vision system.

To counter the deposition of dirt on the video camera it is known to provide a device for cleaning the lens of the video camera, notably a cleaning liquid nozzle, in the vicinity of the latter video camera, to eliminate pollutants deposited over time.

However, the lens of the video camera, which is a relatively fragile component, is not protected from splashes that could damage it.

It is also known to mount the video camera inside the exterior bodywork of the vehicle and to protect it from eternal aggression by means of a protective window fixed to the bodywork.

Thus there is known from the document WO 2005 039934 in the name of the applicant mounting a rear view video camera in a protective housing including a viewing window. This setup further includes a device for spraying a cleaning liquid onto the viewing window. The video camera is therefore well protected as well as enabling an optimum view to be obtained after cleaning.

There is known from the document WO 2005/021329 in the name of the applicant a rear view system including a mobile flap mounted to move between a closed position and an open position in which said flap is respectively disposed in front of and away from the lens of the video camera together with drive means adapted to drive movement of the flap between the closed position and the open position. When the reverse gear of the vehicle is not selected the flap is therefore in its closed position and protects the video camera from dirt.

According to one embodiment of the rear view system from the document WO 2005/021329 the video camera is mounted in a housing that features an opening closed by a transparent protective window.

The flap can include a wiper blade so that each time the flap is opened or closed the transparent protective screen is cleaned.

Although effective, this solution is nevertheless costly and bulky because the drive mechanism is complicated. Moreover, to be effective, the curvature of the protective window must be perfectly matched to the circular arc trajectory of the flap and thus of the wiper blade carried by the flap, which implies close manufacturing tolerances leading to a high manufacturing cost.

The present invention proposes to remedy the aforementioned disadvantages at least in part by offering an alternative rear view system that is less bulky and enables optimized vision by the rear view video camera, as well as a method of operating the system.

To this end, the invention consists in a motor vehicle rear view system including:
- an optical imaging sensor,
- a protective support including a flat transparent protective screen, the optical sensor being installed on the protective support so as to see through said protective screen, and
- a wiper blade for cleaning the protective screen disposed on the face of the protective screen opposite that on the same side as the optical sensor, characterized in that it further includes a device for electromagnetic actuation of movement in translation of said wiper blade over the protective screen.

The overall size of a vision system of the above kind can therefore be reduced as well as making it possible to maintain a perfect view if dirt is deposited.

The rear view system according to the invention may further include one or more of the following features separately or in combination:

The electromagnetic actuating device includes for example at least one ferromagnetic or magnetized element and at least one electromagnet, one of which is carried by the wiper blade and the other of which is carried by the protective support.

According to one aspect, the electromagnetic actuating device includes at least one return spring for urging the wiper blade into its rest position when the electromagnetic actuating device is not supplied with power.

According to another aspect, the electromagnetic actuating device includes means for guiding the wiper blade along a wiping direction parallel to the protective screen so as to clean the latter.

The means for guiding the wiper blade may include a first guide rail and a second guide rail parallel to each other and oriented in the wiping direction of the wiping blade.

For example, the system further includes a device for spraying at least one jet of a washing liquid onto the protective screen.

Moreover, it may further include a unit for heating the washing liquid.

According to one aspect, the protective screen includes resistive wires for heating the protective screen.

According to another aspect, the wiper blade includes resistive heating wires.

The invention also concerns a method of operating a rear view system as defined above, characterized in that the electromagnet is supplied with power according to a predefined decreasing current profile.

According to one aspect, the supply of power to the electromagnet is triggered on reception of a signal engaging a reverse gear of the motor vehicle.

According to another aspect, the power supply current is cut off when the electromagnet and the ferromagnetic or magnetized element come into contact.

Figure 2:
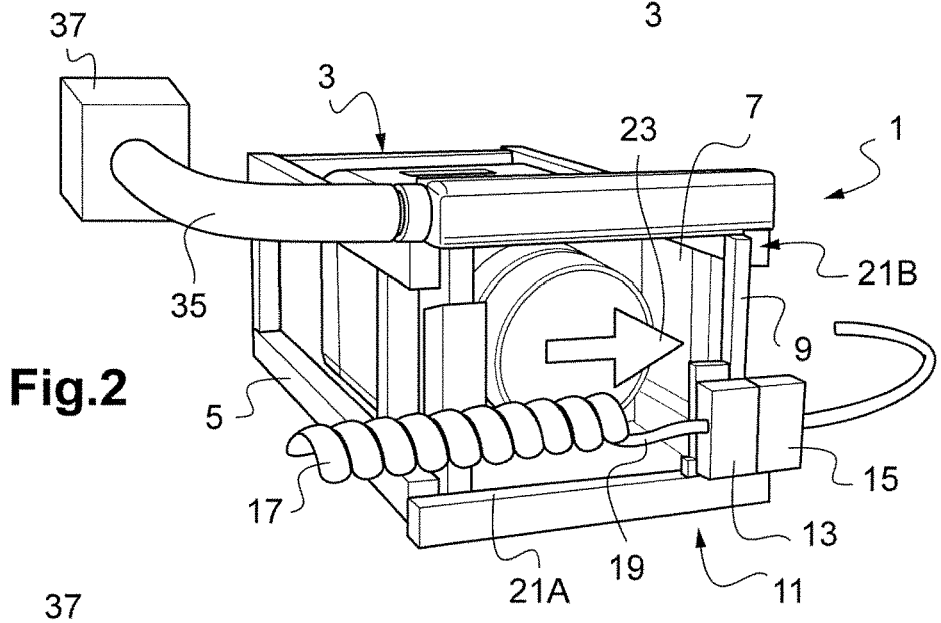
Figure 3:
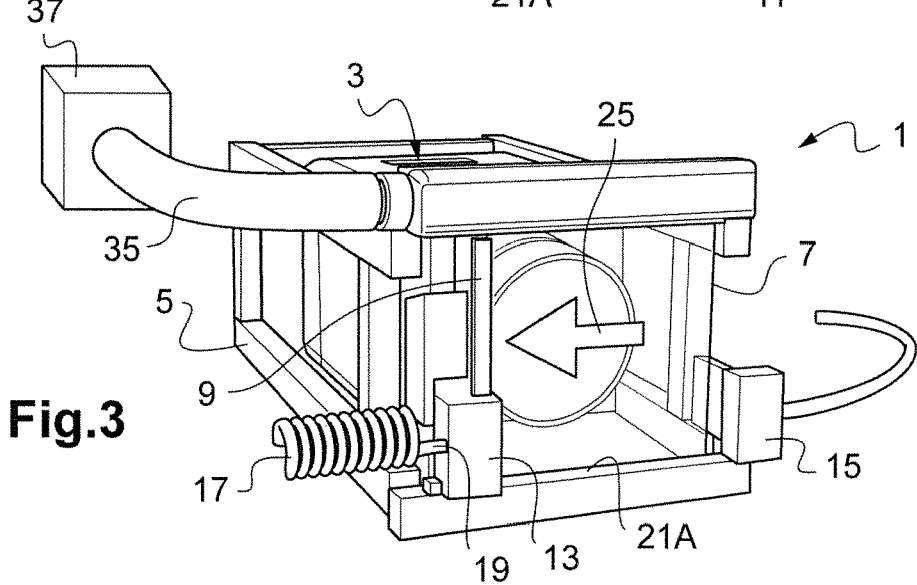

Other advantages and features will become apparent on reading the description of the invention and from the appended drawings, in which:

FIG. 1 shows a perspective view of a vision system according to the invention in a rest position, FIG. 2 shows a front view of the system from FIG. 1 after a go stroke of the wiper blade, and FIG. 3 shows a front view of the system from FIG. 1 after a return stroke of the wiper blade.

In these figures, identical elements bear the same reference numbers.

The following embodiments are examples. Although the description refers to one or more embodiments, this does not necessarily mean that each reference concerns the same embodiment or that the features apply to only one embodiment. Single features of different embodiments may also be combined to produce other embodiments.

FIGS. 1 to 3 show a motor vehicle rear view system 1 according to the invention.

The rear view system 1 is for example intended to be mounted at the rear of a motor vehicle, for example at the level of a bumper or a license plate (not shown).

This rear view system 1 includes an optical imaging sensor 3, for example a video camera, and a protective support 5 including a flat transparent protective screen 7 such as a glass or polycarbonate window.

The optical sensor 3 includes a convex (domed) lens 8 such as a fish-eye lens.

The protective support 5 can take the form of a frame as shown in the figures or the form of a closed housing at least part of one side of which is formed by the protective screen 7.

The optical imaging sensor 3 is installed on the protective support 5 so as to see through said protective screen 7.

The rear view system 1 further includes a wiper blade 9 for cleaning the protective screen 7 disposed on the face of the protective screen opposite that on the same side as the optical sensor 3.

The wiper blade 9 is for example of the type known as a squeegee blade and includes for example an elastomer or rubber longitudinal part 9A held by a U-shaped longitudinal profiled armature 9B.

To move the wiper blade 9 in translation in a direction parallel to the protective screen 7 the rear view system further includes an electromagnetic device 11 for actuation of movement in translation of said wiper blade 9 over the protective screen 7.

This electromagnetic actuating device 11 includes for example at least one ferromagnetic or magnetized element 13 and at least one electromagnet 15, one of which (in the present instance the ferromagnetic or magnetized element 13) is carried by the wiper blade 9 and the other of which (in the present instance the electromagnet 15) is carried by the protective support 5.

In the present example, the ferromagnetic or magnetized element 13 takes the form of a single block disposed at the level of a lower end (as seen in the figures) of the wiper blade 9.

Other locations may be envisaged, for example a central position of the ferromagnetic or magnetized element 13 on the wiper blade 9, or disposing two ferromagnetic or magnetized elements 13 at the ends of the wiper blade 9 facing two corresponding electromagnets 15 may be envisaged.

According to a further embodiment, the ferromagnetic or magnetized element 13 extends over the full length of the wiper blade 9 and the electromagnet 15 also extends over that same length.

Accordingly, for all these variants, starting from the rest position shown in FIG. 1, on energizing the electromagnet 15 an attractive magnetic field will attract the ferromagnetic or magnetized element 13 for a "go" pass of the wiper blade 9 that enables a first cleaning pass that continues until the ferromagnetic or magnetized element 13 comes into contact with the electromagnet 15 (see FIG. 2).

To provide the return movement the electromagnetic actuating device 11 includes at least one return spring 17, for example, a coil spring, for example, force-fitted to said wiper blade 9 to urge the latter into its rest position shown in FIGS. 1 and 3 when the electromagnetic actuating device 11, in particular the electromagnet 15, is not energized. In the present example, one end turn 19 of the spring 17 is attached to the ferromagnetic or magnetized element 13 and the other end turn (not visible in the figures) is attached to a fixed structural element, for example an element of the vehicle.

According to a variant in which the element 13 is a magnet one pole of which, for example the north pole, is on the same side as the electromagnet 15 and the other pole of which, for example the south pole, is on the opposite side, the return spring 17 can be dispensed with and the return pass of the wiper blade 9 driven by reversing the direction of the magnetic field so that the electromagnet 15 exerts a repulsive magnetic force to push the wiper blade 9 back into rest position.

According to another variant that is not shown an electromagnet 15 is disposed on each side of the path followed by the wiper blade 9 and the two electromagnets are energized alternately to move the wiper blade 9 toward one or the other of the two electromagnets 15. In this version, there is no longer any need for a return spring either.

The movement of the wiper blade 9 in a direction parallel to the protective screen 7 so as to clean the latter is guided by guide means 21A, 21B.

The means for guiding the wiper blade 9 include for example a first guide rail 21A and a second guide rail 21B parallel to each other and oriented in the wiping direction (indicated by the arrows 23 and 25 in FIGS. 2 and 3 respectively).

As shown in FIG. 1, cleaning can optionally be improved by adding to the rear view system 1 a device for spraying one or more jets 29 (in the present instance five jets) of a washing liquid onto the protective screen 7.

Here the sprayer device 27 includes for example a manifold 31 with five orifices serving as spray nozzles. The manifold 31 is connected via a feed pipe 35 to a discharge pump that is not shown.

To prevent icing up problems in cold weather, the system may include a unit 37 for heating the washing liquid.

Instead of this or in addition to this, one or more resistive heating wires may be integrated into the protective screen 7. When the resistive wires are supplied with power, they therefore give off heat that de-ices the protective screen 7. In this case the resistive wires are very thin so that they do not appear in the image from the optical sensor 3, i.e. the video camera.

According to a further variant the wiper blade 9 features resistive heating wires integrated into the elastomer or rubber part 9A or a PTC heating ceramic component fixed to the armature 9B.

The vision system according to the invention operates in the following manner:

When the driver of the motor vehicle engages reverse gear, for example, the rear view system 1 receives a control signal the effect of which is first to trigger the spraying of a washing liquid onto the protective screen 7 (FIG. 1), after which the electromagnet 15 is energized. The latter will therefore attract the ferromagnetic or magnetized element 13 (see FIG. 2). The wiper blade 9 will then clean the protective screen 7 during a "go" pass.

The electromagnet 15 may be energized in accordance with a predefined decreasing current profile, i.e. the supply current and therefore the attractive magnetic field may decrease as the element 13 approaches the electromagnet 15 so as to obtain a virtually constant wiping speed. This energization process is above all advantageous if there is no return spring or a spring producing a low force compared to the magnetic force exerted by the electromagnet 15.

The power is then cut off when the electromagnetic 15 and the ferromagnetic or magnetized element 13 come into contact.

In this case, the return spring 17 will urge the wiper blade 9 into its rest position. The protective screen 7 is clean and enables the optical imaging sensor 3 to deliver a clean and sharp image of the scene to be observed behind the vehicle.

It is therefore clear that the optical imaging sensor 3 is well protected from dirt by the electromagnetic translation actuating device 11 and that the rear view system has a small overall size. Moreover, the assembly features fewer components than prior art assemblies and systems, which makes it possible to reduce further the cost and the risks of malfunction.

The invention claimed is:

1. A motor vehicle rear view system comprising:
    an optical imaging sensor;
    a protective support including a flat transparent protective screen, the optical sensor being installed on the protective support so as to see through said protective screen;
    a wiper blade for cleaning the protective screen disposed on a face of the protective screen and on a side of the protective screen opposite to the optical sensor; and
    an electromagnetic actuator that actuates movement in translation of said wiper blade over the protective screen between a rest position and an actuated position,
    wherein a width of the wiper blade is less than a width of the protective screen such that, when the wiper blade operates, the wiper blade does not entirely block a field of view of the optical imaging sensor,
    wherein the electromagnetic actuator is on the same side of the screen as the wiper blade and includes at least one electromagnet, and at least one ferromagnetic or magnetized element, wherein one of the at least one ferromagnetic or magnetized element and the at least one electromagnet is carried by the wiper blade and the other one is carried by the protective support and
    wherein when the wiper blade is in the rest position, the at least one ferromagnetic or magnetized element and the at least one electromagnet are spaced from one another on opposite edges of the protective screen.

2. The system as claimed in claim 1, wherein the electromagnetic actuator includes at least one return spring for urging the wiper blade into its rest position when the electromagnetic actuator is not supplied with power.

3. The system as claimed in claim 1, wherein the electromagnetic actuator includes means for guiding the wiper blade along a wiping direction parallel to the protective screen so as to clean the latter.

4. The system as claimed in claim 3, wherein the means for guiding the wiper blade include a first guide rail and a second guide rail parallel to each other and oriented in the wiping direction of the wiping blade.

5. The system as claimed in claim 1, further comprising a device for spraying at least one jet of a washing liquid onto the protective screen.

6. The system as claimed in claim 4, further comprising a unit for heating the washing liquid.

7. The system as claimed in claim 1, wherein the protective screen includes resistive wires for heating the protective screen.

8. The system as claimed in claim 1, wherein the wiper blade includes resistive heating wires.

9. A method of operating a rear view system as claimed in claim 1, wherein the electromagnet is supplied with power according to a predefined decreasing current profile.

10. The operating method as claimed in claim 9, wherein the supply of power to the electromagnet is triggered on reception of a signal engaging a reverse gear of a motor vehicle.

11. The method as claimed in claim 9, wherein a power supply current is cut off when the electromagnet and the ferromagnetic or magnetized element come into contact.

* * * * *